US012497555B2

(12) United States Patent
Halim et al.

(10) Patent No.: US 12,497,555 B2
(45) Date of Patent: Dec. 16, 2025

(54) DEMULSIFIER

(71) Applicant: PETROLIAM NASIONAL BERHAD (PETRONAS), Kuala Lumpur (MY)

(72) Inventors: Nor Hadhirah Halim, Selangor (MY); Farah Fazlina M Yasin, Selangor (MY); Intan Khalida Salleh, Selangor (MY); Jamal Mohamad M Ibrahim, Selangor (MY)

(73) Assignee: PETROLIAM NASIONAL BERHAD (PETRONAS), Kuala Lumpur (MY)

( * ) Notice: Subject to any disclaimer, the term of this patent is extended or adjusted under 35 U.S.C. 154(b) by 280 days.

(21) Appl. No.: 18/253,728

(22) PCT Filed: Nov. 24, 2021

(86) PCT No.: PCT/MY2021/050107
§ 371 (c)(1),
(2) Date: May 19, 2023

(87) PCT Pub. No.: WO2022/114949
PCT Pub. Date: Jun. 2, 2022

(65) Prior Publication Data
US 2023/0416597 A1 Dec. 28, 2023

(30) Foreign Application Priority Data

Nov. 27, 2020 (MY) .............................. PI2020006288

(51) Int. Cl.
*C09K 8/588* (2006.01)
*C08G 77/46* (2006.01)
*C09K 8/584* (2006.01)

(52) U.S. Cl.
CPC .............. *C09K 8/588* (2013.01); *C08G 77/46* (2013.01); *C09K 8/584* (2013.01)

(58) Field of Classification Search
None
See application file for complete search history.

(56) References Cited

U.S. PATENT DOCUMENTS 4,183,820 A * 1/1980 Theile .................... C10G 33/04
516/144
4,316,806 A 2/1982 Canevari
4,737,265 A 4/1988 Merchant, Jr. et al.
(Continued)

FOREIGN PATENT DOCUMENTS

CA 2519172 C 11/2011
EP 2063971 B1 6/2017
(Continued)

OTHER PUBLICATIONS

International Search Report and Written Opinion for corresponding Application No. PCT/MY2021/050107 (mailed Apr. 5, 2022).
(Continued)

Primary Examiner — Jeffrey D Washville
(74) Attorney, Agent, or Firm — Troutman Pepper Locke LLP (Rochester)

(57) ABSTRACT

The invention provides a demulsifier compound, formulations comprising the demulsifier compound, and methods for preparing the demulsifier compound.

16 Claims, 4 Drawing Sheets

(56) References Cited

U.S. PATENT DOCUMENTS

| | | | |
|---|---|---|---|
| 5,461,088 A * | 10/1995 | Wolf | G03F 7/0037 |
| | | | 522/143 |
| 2013/0261227 A1 | 10/2013 | Nguyen | |
| 2014/0303265 A1 | 10/2014 | Rey et al. | |

FOREIGN PATENT DOCUMENTS

| | | | | |
|---|---|---|---|---|
| WO | 2012/068099 A1 | 5/2012 | | |
| WO | 2016-084104 A1 | 6/2016 | | |
| WO | WO-2020040633 A1 * | 2/2020 | | C09K 8/584 |

OTHER PUBLICATIONS

International Preliminary Report on Patentability for Corresponding Application No. PCT/MY2021/050107 (May 30, 2023).

* cited by examiner

DEMULSIFIER

This application is a national stage application under 35 U.S.C. § 371 of International Application No. PCT/MY2021/050107, filed Nov. 24, 2021, which claims priority benefit of Malaysia Application No. PI2020006288, filed Nov. 27, 2020.

FIELD OF THE INVENTION

The invention provides a demulsifier compound, formulations comprising said demulsifier compound, and methods for preparing said demulsifier compound.

BACKGROUND

The processing of crude oil extracted from a well during a chemical enhanced oil recovery (COER) process typically involves mixing the crude oil with large amounts of water (e.g. seawater). This results in an emulsion being formed, with both oil-in-water (O/W) and water-in-oil (W/O) components. Separation of the crude oil from the water requires breaking the emulsion, which can be challenging, especially because the emulsion will typically comprise suspended solids such as sand that are wetted by both water and oil, and act to stabilise the emulsion. Furthermore, heavy components in the crude such as asphaltene and paraffin waxes often adsorb strongly to the oil-water interface and add additional stability to the emulsion.

Given the strong emulsions that are often formed, demulsifier compounds and formulations are typically added to assist in the breaking of the emulsions. Demulsifier compounds/formulations typically act to disrupt the emulsion, thereby facilitating the separation of the oil and water phases.

There is a need for improved demulsifier compounds and formulations to help the breaking of emulsions during crude oil processing.

BRIEF SUMMARY OF THE INVENTION

The present invention provides demulsifier compounds and formulations comprising the compounds. Thus, the invention provides the following.

1. A compound of formula (I):

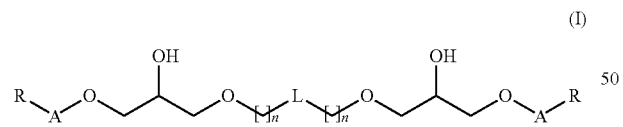

(I)

wherein,
each R independently represents a linear or branched $C_{1-6}$ alkyl chain;
each A independently represents a polyethylene glycol or polypropylene glycol chain having a number average molecular weight of from about 300 to about 800;
each n independently represents an integer of from 1 to 6;
L represents a poly(dialkylsiloxane) having a number average molecular weight of from about 2000 to about 5000 Daltons.

2. The compound of Clause 1, wherein each R independently represents a linear or branched $C_{1-4}$ alkyl chain, optionally wherein each R independently represents a methyl or ethyl group.

3. The compound of Clause 1 or 2, wherein each R represents methyl.
4. The compound of any one of the preceding clauses, wherein each A independently represents a polyethylene glycol chain having a number average molecular weight of from 300 to 800 Daltons.
5. The compound of any one of the preceding clauses, wherein each A independently represents a polyethylene glycol chain having a number average molecular weight of from 500 to 600 Daltons.
6. The compound of any one of the preceding clauses, wherein each n independently represents an integer of from 2 to 4, optionally wherein each n represents 3.
7. The compound of any one of the preceding clauses, wherein L represents a poly(dimethylsiloxane) having a number average molecular weight of from about 2000 to about 5000 Daltons, optionally having a number average molecular weight of from about 3000 to about 4000 Daltons.
8. The compound of any one of the preceding clauses, wherein:
each R is the same;
each A is the same; and
each n is the same.
9. The compound of any one of the preceding clauses, wherein:
each R represents methyl;
each A represents a polyethylene glycol chain having a number average molecular weight of from 500 to 600 Daltons;
each n represents 3; and
L represents a poly(dimethylsiloxane) having a number average molecular weight of from about 3000 to about 4000 Daltons.
10. A formulation comprising:
a compound according to any one of Clauses 1 to 9; and
one or more of:
  a solvent;
  a demulsifier compound; and
  a polysorbate polyester compound.
11. The formulation of Clause 10, comprising 10-30 wt % of a compound according to any one of Clauses 1 to 9.
12. The formulation of Clause 10, comprising:
20-30 wt % of a compound according to any one of Clauses 1 to 9;
5-20 wt % of a resin alkoxylate demulsifier compound;
5-20 wt % of a polysorbate polyester compound
50-70 wt % of aromatic solvent 150.
13. A method of preparing a compound of formula (I), said method comprising the steps:
(A) providing a compound of formula (II):

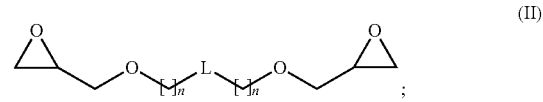

(II)

and
(B) reacting said compound of formula (II) with at least two equivalents of a compound of formula (III):

(III)

wherein in formula (II) and (III), R, A, L and n are as defined in any one of Clauses 1 to 9.

DETAILED DESCRIPTION OF THE INVENTION

Figure 1:
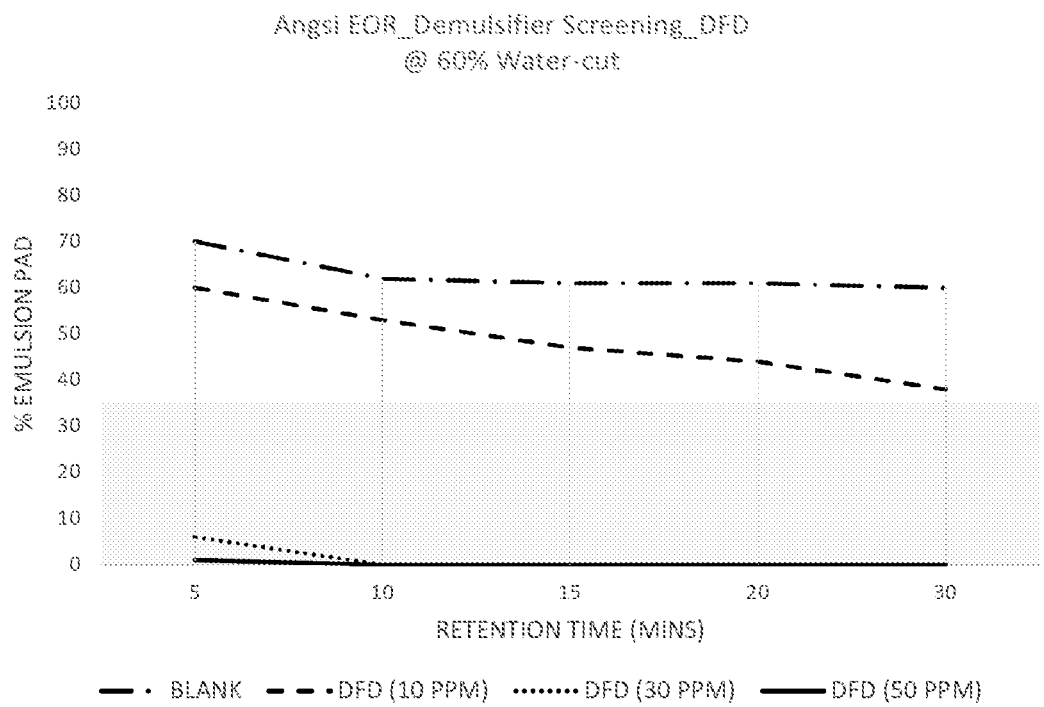
FIG. 1 shows the breaking of a static emulsion using various concentrations of a demulsifier formulation according to the invention.

The invention provides a compound of formula (I):

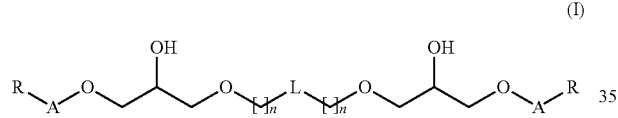

(I)

wherein,
each R independently represents a linear or branched $C_{1-6}$ alkyl chain;
each A independently represents a polyethylene glycol or polypropylene glycol chain having a number average molecular weight of from about 300 to about 800;
each n independently represents an integer of from 1 to 6;
L represents a poly(dialkylsiloxane) having a number average molecular weight of from about 2000 to about 5000 Daltons.

As used herein, "alkyl" refers to a monovalent alkyl group which, unless otherwise stated, may be straight chained or branched. Examples of such alkyl groups include methyl, ethyl, n-propyl, iso-propyl, n-butyl, iso-butyl, sec-butyl, tert-butyl, n-hexyl, and the like. As used herein, $C_1$-$C_6$ alkyl refers to an alkyl group having 1 to 6 carbon atoms.

As used herein in the context of moiety A in formula (I), a polyethylene glycol chain is a bivalent group formed from removing two terminal hydrogen atoms from a polyethylene glycol molecule. Thus, a polyethylene glycol chain may have a formula:

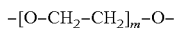

As used herein in the context of moiety A in formula (I), a polypropylene glycol chain is a bivalent group formed from removing two terminal hydrogen atoms from a polypropylene glycol molecule. Thus, a polypropylene glycol chain may have a formula:

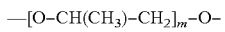

The number average molecular weight of a polymer (e.g. of polyethylene glycol, polypropylene glycol or poly(dialkylsiloxane)) is defined as the total weight of polymer in Daltons divided by the total number of molecules.

As used herein, a poly(dialkylsiloxane) chain is a bivalent chain of the formula:

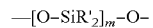

where each R' independently represents an alkyl group, for example a $C_{1-6}$ alkyl group, such as methyl or ethyl. Typically, both R' will be the same. In some embodiments, the poly(dialkylsiloxane) chain is a poly(dimethylsiloxane) chain, i.e. each R' represents methyl.

Various preferred embodiments of the invention are described below.

In some embodiments of the compound of formula (I), each R may independently represent a linear or branched $C_{1-4}$ alkyl chain, for example a methyl or ethyl group. In some particular embodiments of the invention, each R may represent methyl.

Typically, each A independently represents a polyethylene glycol chain having a number average molecular weight of from 300 to 800 Daltons, such as from 500 to 600 Daltons.

Typically, each n independently represents an integer of from 2 to 4, such as 3.

Typically, L represents a poly(dimethylsiloxane) having a number average molecular weight of from about 2000 to about 5000 Daltons, such as from about 3000 to about 4000 Daltons.

In some embodiments of the invention, each R is the same; and/or each A is the same; and/or each n is the same. In some particular embodiments of the invention, each R is the same; each A is the same; and each n is the same.

In some embodiments of the invention,
each R represents methyl;
each A represents a polyethylene glycol chain having a number average molecular weight of from 500 to 600 Daltons;
each n represents 3; and
L represents a poly(dimethylsiloxane) having a number average molecular weight of from about 3000 to about 4000 Daltons.

The invention provides demulsifier formulations comprising a compound of formula (I). Thus, the invention provides a formulation comprising:
a compound of formula (I) as described above; and
one or more of:
a solvent;
a demulsifier compound; and
a polysorbate polyester compound.

The solvent may be any suitable solvent known to person skilled in the art, such as non-polar organic solvents or polar organic solvents. Particular solvents that may be mentioned herein include aromatic solvents, such as aromatic solvent 150, mesitylene, toluene, and xylene, as well as non-aromatic solvents such as isopropyl alcohol, 2-butoxyethanol, n-butanol, n-octanol, and i-hexanol. A particular solvent that may be mentioned herein is aromatic solvent 150.

The demulsifier compound may be any known demulsifier compound, such as a commercially available demulsifier compound. A particular class of demulsifier compounds that may be mentioned herein include resin alkoxylate demulsifier compounds, particularly resin alkoxylate demulsifier compounds having a relative solubility number of greater than 17.

The polysorbate polyester typically has a relative solubility number of from 13 to 17.

In some embodiments, the formulation comprises 10-30 wt % of a compound of formula (I).

In some particular embodiments of the invention, the formulation comprises:
20-30 wt % of a compound of formula (I);
5-20 wt % of a resin alkoxylate demulsifier compound;
5-20 wt % of a polysorbate polyester compound
50-70 wt % of aromatic solvent 150.

The invention also provides a method of preparing a compound of formula (I), said method comprising the steps:
(A) providing a compound of formula (II):

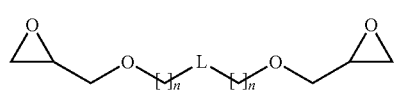

and
(B) reacting said compound of formula (II) with at least two equivalents of a compound of formula (III):

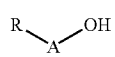

wherein in formula (II) and (III), R, A, L and n are as defined above.

Typically, the compound of formula (I) will be used within a demulsifier formulation as described herein. The demulsifier formulations of the invention generally comprise the demulsifier compound of the invention (i.e. the compound of formula (I)) with another base demulsifier and solvent(s), and optionally a polysorbate polyester, to form demulsifier formulations that may be tailored to specific crude and water properties at an oil field.

For normal emulsion and EOR induced types of emulsion, a typical formulation may comprise a demulsifier compound of formula (I), and a mixture of alkoxylate resin compound, polysorbate polyester compound and aromatic solvent 150.

1. Aromatic solvent 150 (e.g. Solvesso 150) acts as a carrier for the active ingredients of the formulation. As well as acting as a solvent, Aromatic solvent 150 is very good at dissolving oily compounds that are poorly soluble in water. Aromatic solvent 150 makes an excellent solvent for hydrophobic compounds and helps to reduce oil in water (OIW) and produce good water quality for disposal by affecting the properties of the interfacial film that can facilitate coalescence and water separation. Solvesso 150 has an advantageously high flash point of 62° C.

2. A resin alkoxylate demulsifiers is used as a surface-active ingredient. Typically, a high relative solubility number (RSN) value is used. High RSN value of resin alkoxylate helps it destabilize the water in oil emulsion. A high RSN also provides a stronger desalter and water dropper effect by total or partial displacement of the indigenous stabilizing interfacial film components (polar materials) around the water droplets.

3. Polysorbate polyester works as a flocculant for the water phase, helping to flocculate the water droplets and facilitate coalescence. Polysorbate polyester also works as a strong dehazer, which enchances the clarity and quality of water.

Thus, the demulsifier compounds and formulations of the invention are able to provide the below benefits.
Counter the emulsification ability of EOR surfactants to provide improved crude dehydration.
Effectively and quickly eliminate rag layers and reduce water-in-oil (W/O) emulsions.
Help flocculate the oil droplets in the water phase and facilitate coalescence to enhance the clarity and quality of water.
These benefits are demonstrated in the below Examples.

EXAMPLES

The below Examples illustrate the invention and should not be construed as limitative.

Example 1: Synthesis of the Demulsifier Compound and Formulation

A demulsifier compound of formula (I) was prepared as follows.

To an oven-dried 100 ml 3-neck round bottom flask, HO-PEG-Me (number average molecular weight: 549) (15 g, 27 mmol) and potassium tert-butoxide (3.01 g, 27 mmol) were added at room temperature while purging with nitrogen gas. The reactants were stirred at 50° C. for 1 hour. Poly (dimethylsiloxane), diglycidyl ether (Gly-PDMS-Gly) (5.6 mL, 6.8 mmol) was added to the mixture under vigorously stirring and the reaction was allowed to continue for an additional 46 hours at 50° C. The product was transferred to a separator funnel with 150 mL DI water and was washed three times with hexanes (50 mL each) to remove unreacted PDMS. The aqueous fraction was then extracted three times with dichloromethane (150 ml each). The dichloromethane fractions were combined and reduced to ~200 ml. The dichloromethane solution was then washed three times with water (100 ml) to remove unreacted PEG. The final dichloromethane solution was dried over sodium sulfate, filtered, and placed in a Rotovap apparatus to produce the synthesized demulsifier compound in light yellow liquid form (9.6 g, 74% yield).

The synthesized demulsifier compound was mixed with other components, namely polysorbate polyester, a resin alkoxylate demulsifier, and aromatic solvent 150 with the composition below to produce a demulsifier formulation. This formulation is suitable for resolving normal Water in Oil emulsion as well as Chemical EOR emulsions. The demulsifier formulation is referred to below as DFD A13.

The demulsifier formulation DFD A13 has the following composition:
20-30 wt % of the synthesized demulsifier compound;
5-20 wt % of a resin alkoxylate demulsifier compound;
5-20 wt % polysorbate polyester compound
50-70 wt % of aromatic solvent 150.

Example 2: Emulsion Tendency and Demulsification Test by Bottle Test

The effect of the demulsifier formulation was tested on a CEOR emulsion. An emulsion (100 ml) was produced in the lab by mixing produced water from the Angsi field (i.e. brine solution) containing 75 ppm of CEOR Amphoteric Surfactant (ethylene glycol n-butyl ether) with the oil. The amount (75 ppm) of surfactant concentration mimics 10% surfactant breakthrough during CEOR based on the core flood adsorption data. For normal emulsion bottle test, the oil and brine were mixed without CEOR surfactant. After mixing of brine with the oil in the torpedo tube, the mixture was hand shaken for 100 times to produce the emulsion. The demulsifier formulation DFD A13 was added to the emulsion fluid, and the torpedo tube was shaken 100 times. The tube was immersed in a water bath at 60° C. following surface process condition of the field. The ratio of produced water to oil used were both 60:40 following 60% watercut as per the field condition. The remaining emulsion was then recorded and used to evaluate the demulsifier performance.

In addition, a Basic Sediment & Water (BS&W) test using Robinson Centrifuge machine and Oil in Water test using TD-500D Oil in Water Analyser were performed to analyze both the sediment remaining in the crude phase, and the oil droplet remaining in the water phase, after demulsifier injection. The Key Performance Indicator of the demulsifier is that the emulsion should be less than 1%, BS&W should be less than 0.5% and a significant improvement of water quality should be observed after the Dual Function Demulsifier injection.

Figure 2:
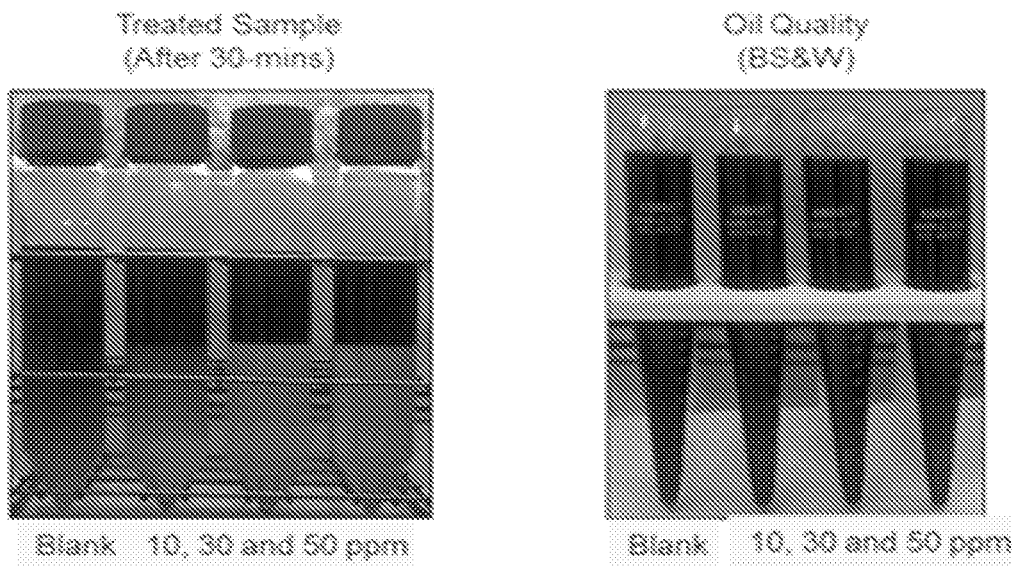
FIG. 2 shows photographs of the broken emulsion formulations and results of a basic sediment and water rest of the oil phase of the separated emulsion.

The prepared demulsifier formulation was tested at various concentrations varying from 10 to 50 ppm of the formulation, with results taken every 5 minutes. The results are shown in FIGS. 1 and 2. It can be seen that addition of 30 and 50 ppm of DFD A13 enabled breaking of the emulsion within the separator retention time. The best results were obtained using 50 ppm of the demulsifier formulation concentration, which provided a significant reduction of oil content in the water phase.

The use of surfactants in the CEOR process, such as amphoteric surfactants which are less water-soluble (less hydrophilic), tends to produce the water-in-oil emulsion. Breaking of this emulsion typically needs a highly water soluble demulsifier with a high relative solubility number (RSN) to resolve the emulsion.

On the functionality of each chemical group, resin alkoxylate may be added since it facilitates a fast breaking of the emulsion, such as within 10 minutes. The synthesised demulsifier DFD A13 assists with the breaking of the emulsion and provides a clear water separation. As shown in Table 1 below, the Oil in Water level in the water phase is significantly reduced by 45% when 50 ppm of DFD is injected into the fluid mixture.

TABLE 1

Emulsion, basic sediment and water (BS&W), and Oil in Water results for demulsifier formulation Injection to a CEOR Emulsion.

| PARAMETER | BLANK (0 ppm) | TREATED (30 ppm) | TREATED (50 ppm) |
|---|---|---|---|
| Emulsion (%) | 60 | 0 | 0 |
| Oil BS&W (%) | 0.1 | 0.1 | 0.1 |
| Water Clarity | Slight Hazy | Slight Hazy | Slightly Clear |
| OIW Quality (ppm) | 226 | 302 | 125 (45% emulsion reduction |

Example 3: Dynamic Testing Using Mini Separator Test Rig

Figure 3:
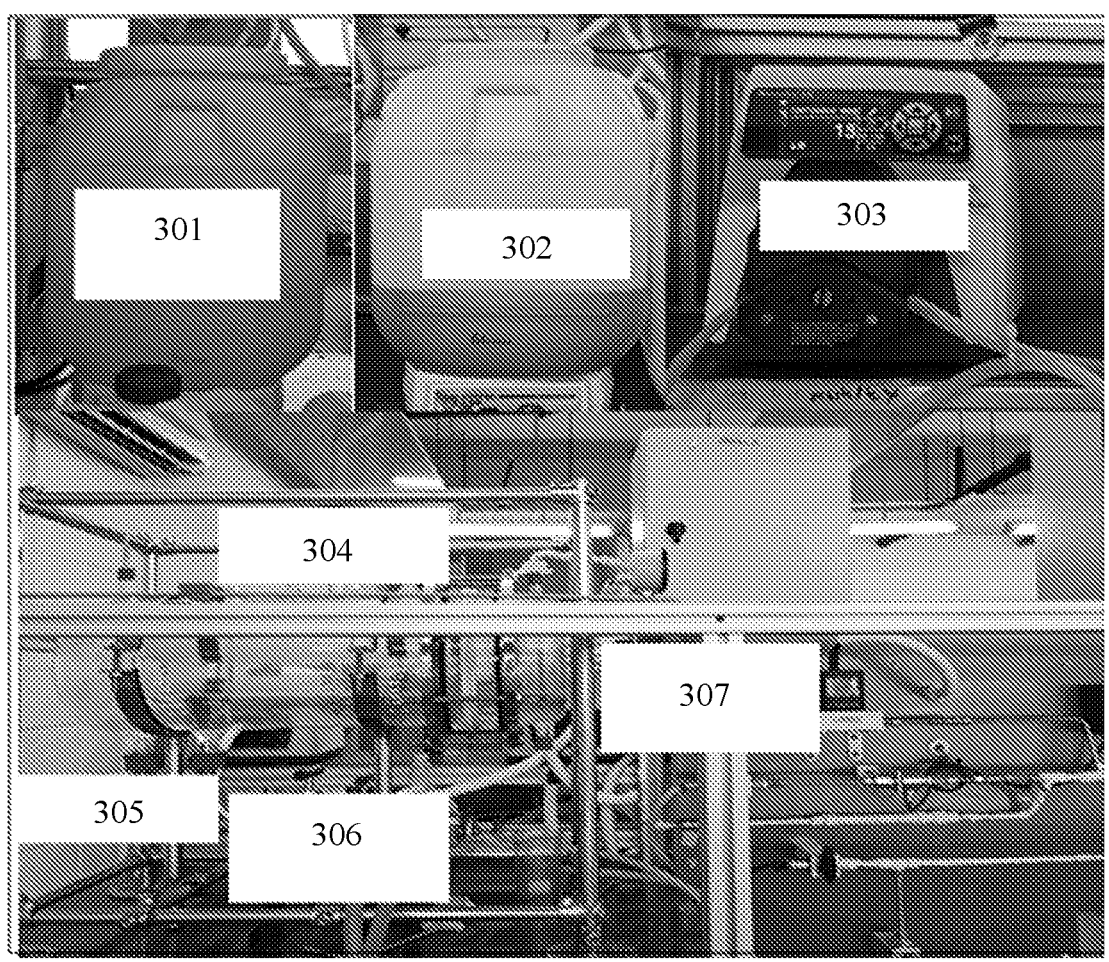
FIG. 3 shows an apparatus setup used to test the performance of the demulsifier of the invention.

In order to prove the effectiveness of the demulsifier for EOR, the demulsifier compound was tested at dynamic conditions using Mini Separator Test Rig. This equipment setup consists of one oil and one water tank, three pumps (an oil pump, a water pump and a demulsifier pump) and one mini separator as depicted in FIG. 3. In FIG. 3, 301 is a water tank, 302 is an oil tank, 303 is a pump, 304 is a separator, 305 is an oil outlet, 306 is a water outlet and 307 is a fluids inlet. The mini separator test rig involves a continuous flow of fluid from the pipeline into the mini separator, simulating the field process condition of 60° C. In order to be satisfactory, the demulsifier need to work within 15 minutes following the separator retention times at Angsi field using 40 Litres of the actual field crude oil and 60 Litres of synthetic Produced water containing the EOR chemicals.

Figure 4:
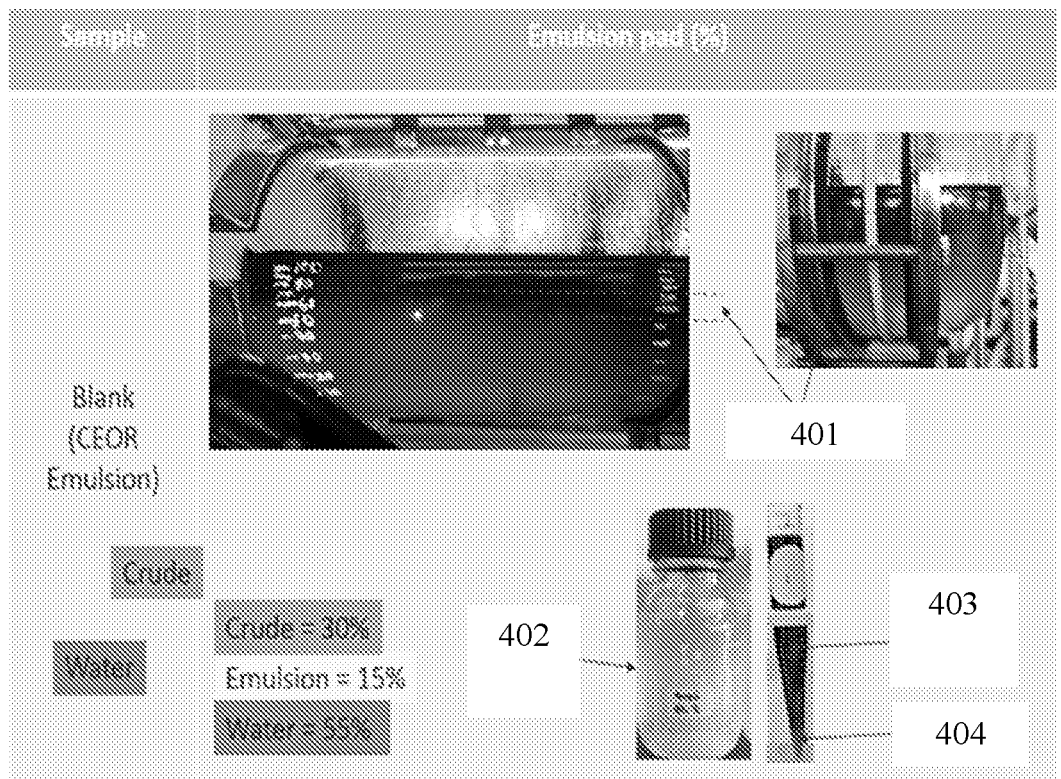
FIG. 4 shows photographic results of a dynamic emulsion test using a mini separator test rig in the absence of demulsifier compound. The results show the clarity of the water phase and oil phase.
Figure 5:
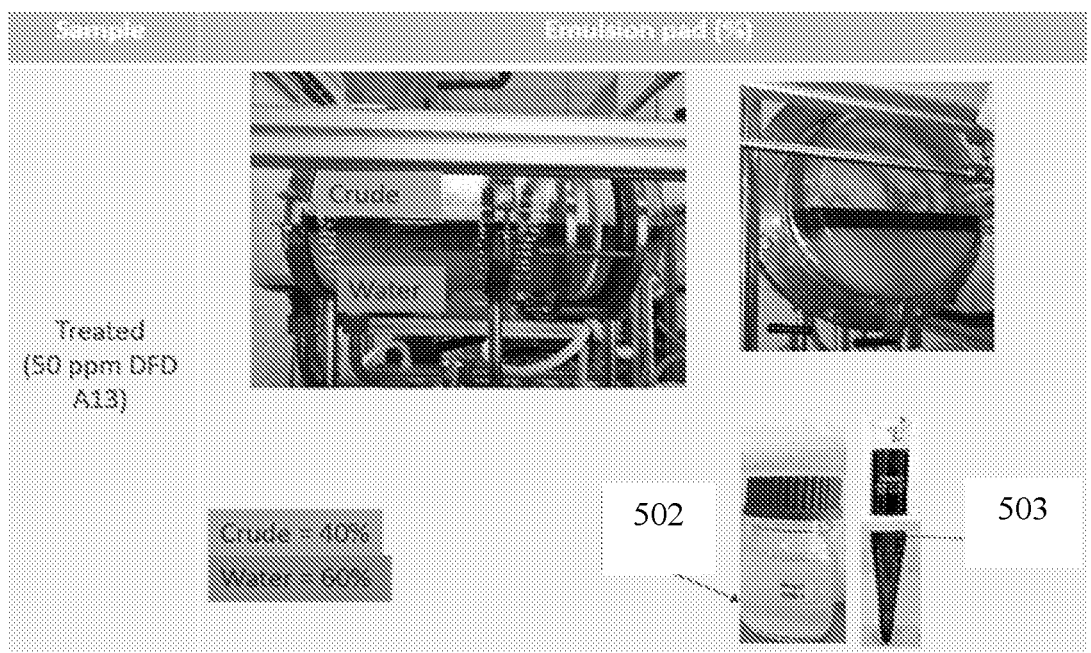
FIG. 5 shows photographic results of a dynamic emulsion test using a mini separator test rig using a demulsifier compound of the invention. The results show the quality of the water phase and oil phase.

FIGS. 4 and 5 show the performance of DFD A13 in dynamic condition using the mini separator test rig. FIG. 4 shows the results for a control sample without DFD A13 (blank). In FIG. 4, 401 shows the emulsion, 402 shows water from the water outlet, 403 shows oil from the crude outlet, and 404 shows sediment present in the oil. The mixture present after the test was 30% crude, 15% emulsion and 55% water. FIG. 5 shows that the emulsion separated well after the injection of 50 ppm DFD A13. In FIG. 5, 502 shows water from the water outlet, while 503 shows oil from the crude outlet. In addition, the demulsifier formulation also reduced the Oil in Water in the water phase, resulting in improved clarity from the Water Outlet after demulsifier injection.

Figure 6:
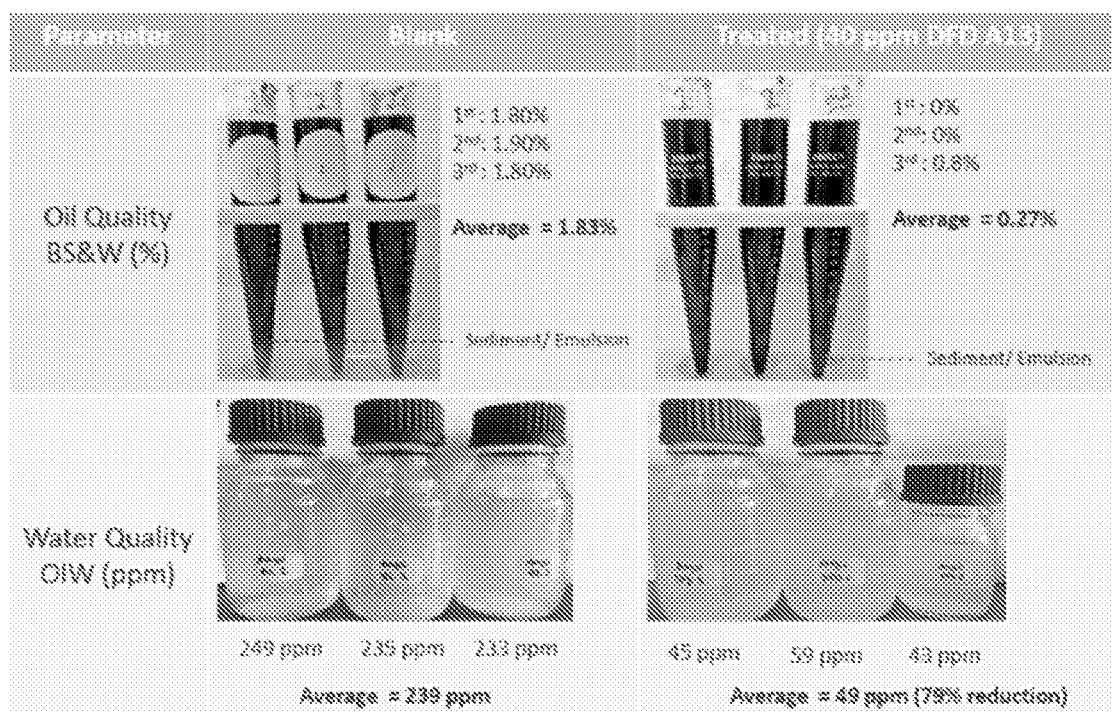
FIG. 6 shows photographic results of oil phase quality (BS&W) and water phase quality (oil-in-water) for the dynamic emulsion test.

FIG. 6 illustrated the BS&W and Oil in Water measurement before (blank) and after injection of 50 ppm DFD A13. BS&W has reduced from 1.83% to 0.27% and Oil in Water content also has reduced tremendously from 239 to 49 ppm. This low value of Oil in Water content is sufficient for Angsi water treatment facilities as this field already includes deoiling hydrocyclone and crude separator to further reduce the Oil in Water content down to 40 ppm for water disposal.

Based on the evaluation above, injection of 50 ppm of DFD A13 provides good breaking of the crude/water emulsion and facilitates the crude processing. A person skilled in the art would understand that the exact nature of a crude oil varies depending on the location at which it is extracted, and so different concentrations of demulsifier may be useful to brek emulsions formed from different crude oils.

The invention claimed is:

1. A compound of formula (I):

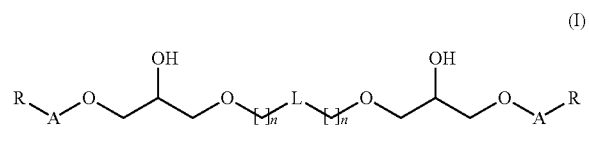

wherein,
each R independently represents a linear or branched $C_{1-6}$ alkyl chain;
each A independently represents a polyethylene glycol or polypropylene glycol chain having a number average molecular weight of from about 300 to about 800;
each n independently represents an integer of from 1 to 6;
L represents a poly(dialkylsiloxane) of formula —[O—SiR'$_2$]$_m$—O—, wherein each R' independently represents an alkyl group and m is an integer whereby the poly(dialkylsiloxane) has a number average molecular weight of from about 2000 to about 5000 Daltons.

2. The compound of claim 1, wherein each R independently represents a linear or branched $C_{1-4}$ alkyl chain.

3. The compound of claim 1, wherein each R represents methyl.

4. The compound of claim 1, wherein each A independently represents a polyethylene glycol chain having a number average molecular weight of from 300 to 800 Daltons.

5. The compound of claim 1, wherein each A independently represents a polyethylene glycol chain having a number average molecular weight of from 500 to 600 Daltons.

6. The compound of claim 1, wherein each n independently represents an integer of from 2 to 4.

7. The compound of claim 1, wherein L represents a poly(dimethylsiloxane) of the formula —[O—SiMe$_2$]$_m$—O— having a number average molecular weight of from about 2000 to about 5000 Daltons.

8. The compound of claim 1, wherein:
each R is the same;
each A is the same; and
each n is the same.

9. The compound of claim 1, wherein:
each R represents methyl;
each A represents a polyethylene glycol chain having a number average molecular weight of from 500 to 600 Daltons;
each n represents 3; and
L represents a poly(dimethylsiloxane) of the formula —[O—SiMe$_2$]$_m$—O— having a number average molecular weight of from about 3000 to about 4000 Daltons.

10. A formulation comprising:
a compound according to claim 1; and
one or more of:
a solvent;
a demulsifier compound; and
a polysorbate polyester compound.

11. The formulation of claim 10, comprising 10-30 wt % of a compound according to claim 1.

12. The formulation of claim 10, comprising:
20-30 wt % of a compound according to claim 1;
5-20 wt % of a resin alkoxylate demulsifier compound;
5-20 wt % of a polysorbate polyester compound;
50-70 wt % of aromatic solvent 150.

13. A method of preparing a compound of formula (I) according claim 1, said method comprising the steps:
(A) providing a compound of formula (II):

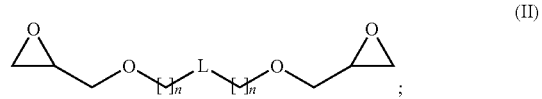

and
(B) reacting said compound of formula (II) with at least two equivalents of a compound of formula (III):

thereby forming the compound of formula (I),
wherein in formula (II) and (III), R, A, L and n are as defined for formula (I).

14. The compound of claim 2, wherein each R independently represents a methyl or ethyl group.

15. The compound of claim 6, wherein each n represents 3.

16. The compound of claim 7, wherein L represents a poly(dimethylsiloxane) of the formula —[O—SiMe$_2$]$_m$—O— having a number average molecular weight of from about 3000 to about 4000 Daltons.

* * * * *